US012782847B2

(12) United States Patent
Tamaki et al.

(10) Patent No.: US 12,782,847 B2
(45) Date of Patent: Nov. 3, 2026

(54) DEVELOPMENT DEVICE AND IMAGE FORMING APPARATUS PROVIDED THEREWITH

(71) Applicant: KYOCERA Document Solutions Inc., Osaka (JP)

(72) Inventors: Tomohiro Tamaki, Osaka (JP); Katen Ko, Osaka (JP); Takeru Nagamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/098,517

(22) Filed: Apr. 2, 2025

(65) Prior Publication Data

US 2025/0314993 A1 Oct. 9, 2025

(30) Foreign Application Priority Data

Apr. 9, 2024 (JP) ................................. 2024-062756
Jan. 8, 2025 (JP) ................................. 2025-002735

(51) Int. Cl.
*G03G 15/08* (2006.01)

(52) U.S. Cl.
CPC ..... *G03G 15/0891* (2013.01); *G03G 15/0808* (2013.01); *G03G 15/0812* (2013.01); *G03G 15/0889* (2013.01); *G03G 2215/0827* (2013.01)

(58) Field of Classification Search
CPC ........... G03G 15/0808; G03G 15/0812; G03G 15/0889; G03G 15/0891
(Continued)

(56) References Cited

U.S. PATENT DOCUMENTS 12,271,125 B2 * 4/2025 Yamada ................. B01D 39/16
12,353,145 B2 * 7/2025 Ariizumi ............ G03G 15/0921
(Continued)

FOREIGN PATENT DOCUMENTS

JP 2010-066377 A 3/2010
JP 2015-129905 A 7/2015
JP 2021-043290 A 3/2021

OTHER PUBLICATIONS

Extended European Search Report dated Aug. 14, 2025, issued by the European Patent Office in corresponding application EP 25168110.2.

*Primary Examiner* — Hoan H Tran
(74) *Attorney, Agent, or Firm* — Stein IP, LLC

(57) ABSTRACT

A development device includes a development container having a first conveyance chamber and a second conveyance chamber above it, first and second stirring conveyance members that stir developer in the first and second conveyance chambers and convey it in the opposite directions, a developer carrying member that carries on its surface the developer in the second conveyance chamber, and a regulation blade. Feeding of the developer to the developer carrying member and collection of the developer from the developer carrying member are performed in the second conveyance chamber. A horizontal straight line L1 through the center of the rotation shaft of the second stirring conveyance member is above a horizontal straight line L2 through the center of the rotation shaft of the developer carrying member and the straight line L2 is above a horizontal straight line L3 through the center of the rotation shaft of the first stirring conveyance member.

3 Claims, 4 Drawing Sheets

(58) Field of Classification Search
USPC .................................. 399/111, 119, 120, 286
See application file for complete search history.

(56) References Cited

U.S. PATENT DOCUMENTS

| | | | | |
|---|---|---|---|---|
| 2012/0099900 | A1 | 4/2012 | Noguchi et al. | .............. 399/254 |
| 2020/0142333 | A1 | 5/2020 | Takeuchi | ........... G03G 15/0889 |

* cited by examiner

DEVELOPMENT DEVICE AND IMAGE FORMING APPARATUS PROVIDED THEREWITH

INCORPORATION BY REFERENCE

This application is based on and claims the benefit of priority from Japanese Patent Application No. 2024-062756 filed on Apr. 9, 2024, and from Japanese Patent Application No. 2025-002735 filed on Jan. 8, 2025, the contents of which are hereby incorporated by reference.

BACKGROUND

The present disclosure relates to a development device and an image forming apparatus provided with a development device. More particularly, the present disclosure relates to a development device that has a first conveyance chamber having arranged in it a stirring conveyance member for stirring and conveying developer and a second conveyance chamber arranged above the first conveyance chamber, and to an image forming apparatus provided with such a development device.

In an image forming apparatus, a latent image formed on an image carrying member formed of a photosensitive material or the like is developed by a development device to be made visible as a toner image. As such a development device, a development device is known that includes a development container that stores developer, first and second stirring conveyance members that stir and convey the developer, and a development roller (developer carrying member) that carries the developer fed from the second stirring conveyance member. The first stirring conveyance member conveys the developer to one side along the axial direction of the development roller and the second stirring conveyance member, while conveying the developer to the other side (opposite to the one side), feeds it to the development roller.

Recently, size reduction has been increasingly demanded in image forming apparatuses. In particular, in color-printing models, where a plurality of development devices are arranged, size reduction of development devices is desired. A development device is therefore known that includes a first conveyance chamber in which a first stirring conveyance member is arranged and a second conveyance chamber that is arranged above the first conveyance chamber and in which a second stirring conveyance member is arranged. In this development device, the first and second conveyance chambers are arranged in the up-down direction and this makes it possible to reduce the size of the development device in the horizontal direction compared to a configuration where the first and second conveyance chambers are arranged in the horizontal direction. This helps reduce the space to arrange the development device and helps reduce the size of the image forming apparatus.

SUMMARY

According to a first aspect of the present disclosure, a development device includes a development container, first and second stirring conveyance members, a developer carrying member, and a regulation blade. The development device develops an electrostatic latent image formed on an image carrying member into a toner image. The development container has a first conveyance chamber and a second conveyance chamber arranged above the first conveyance chamber across a partition portion, and stores two-component developer containing carrier and toner. The first stirring conveyance member is rotatably supported in the first conveyance chamber and conveys, while stirring, the developer in the first conveyance chamber in the first direction. The second stirring conveyance member is rotatably supported in the second conveyance chamber parallel to the first stirring conveyance member and conveys, while stirring, the developer in the second conveyance chamber in the second direction opposite to the first direction. The developer carrying member is rotatably supported on the development container and carries on its surface the developer in the second conveyance chamber. The regulation blade is arranged opposite the developer carrying member and regulates the layer thickness of the developer on the developer carrying member. The feeding of the developer to the developer carrying member and the collection of the developer from the developer carrying member are performed in the second conveyance chamber. A horizontal straight line L1 passing through the center of the rotation shaft of the second stirring conveyance member is located above a horizontal straight line L2 passing through the center of the rotation shaft of the developer carrying member and the straight line L2 is located above a horizontal straight line L3 passing through the center of the rotation shaft of the first stirring conveyance member.

DETAILED DESCRIPTION

Figure 1:
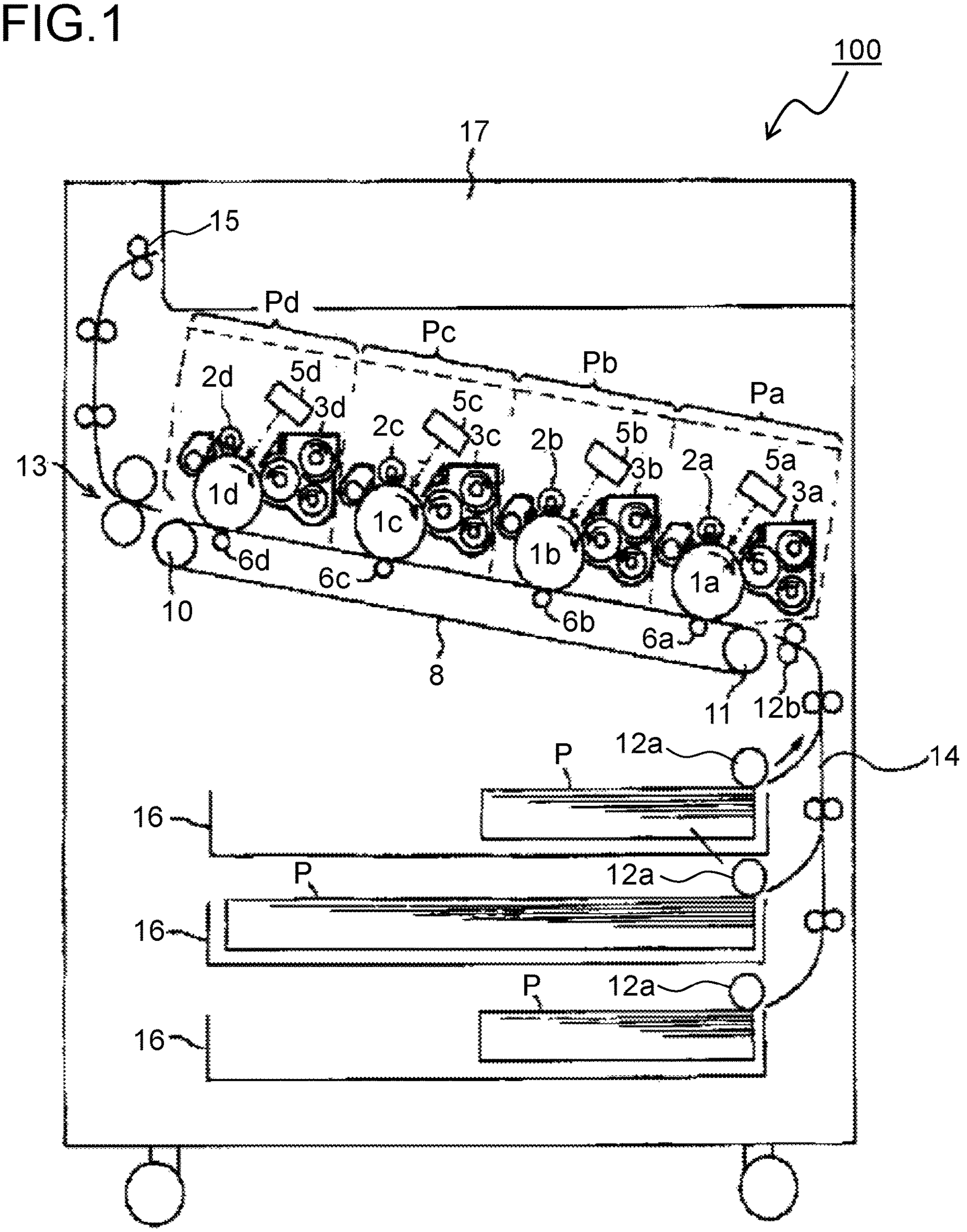
FIG. 1 is a schematic sectional view of an overall configuration of an image forming apparatus provided with development devices according to the present disclosure.

An embodiment of the present disclosure will be described below with reference to the accompanying figures. FIG. 1 is a schematic sectional view of an image forming apparatus 100 provided with development devices 3*a* to 3*d* according to the present disclosure, showing a tandem type color printer. In a main body of the image forming apparatus 100, four image forming portions Pa, Pb, Pc, and Pd are arranged in this order from upstream (right in FIG. 1) in the conveyance direction. The image forming portions Pa to Pd are provided so as to correspond to images of four different colors (yellow, cyan, magenta, and black) and sequentially form magenta, cyan, yellow, and black images, each through the processes of electrostatic charging, exposure to light, image development, and image transfer.

In the image forming portions Pa to Pd are arranged photosensitive drums 1*a*, 1*b*, 1*c*, and 1*d*, which carry visible images (toner images) of the different colors. A conveyance belt 8 that rotates counterclockwise in FIG. 1 is provided adjacent to the image forming portions Pa to Pd. The conveyance belt 8 is stretched around a driving roller 10 and a driven roller 11.

When image data is fed in from a host device such as a personal computer, first, charging devices 2*a* to 2*d* electrostatically charge the surfaces of the photosensitive drums 1*a* to 1*d* uniformly. Next, exposure devices 5*a* to 5*d* irradiates the surfaces of the photosensitive drums 1*a* to 1*d* with light according to the image data to form on them electrostatic latent images according to the image data. The development devices 3*a* to 3*d* are loaded with predetermined amounts of two-component developer (hereinafter, also referred to simply as developer) containing toner of different colors, namely yellow, cyan, magenta, and black, supplied from toner containers 4*a* to 4*d* and magnetic carrier. The toner in the developer is fed from the development devices 3*a* to 3*d* to the photosensitive drums 1*a* to 1*d* and electrostatically adheres to them. Thus, toner images are formed according to the electrostatic latent images formed by exposure to light from the exposure devices 5*a* to 5*d*.

A transfer sheet P to which the toner images are to be transferred is stored inside a sheet cassette 16 arranged in a bottom part of the image forming apparatus 100. The transfer sheet P in the sheet cassette 16 is fed by a sheet feed roller 12*a* to a sheet conveyance passage 14 and is then conveyed to the conveyance belt 8 with predetermined timing via a pair of registration rollers 12*b*.

Then, transfer rollers 6*a* to 6*d* apply an electric field at a predetermined transfer voltage between the transfer rollers 6*a* to 6*d* and the photosensitive drums 1*a* to 1*d*, and thereby the yellow, cyan, magenta, and black toner images on the photosensitive drums 1*a* to 1*d* are sequentially transferred to the transfer sheet P conveyed while being sucked to the conveyance belt 8. The toner and the like remaining on the surfaces of the photosensitive drums 1*a* to 1*d* after transfer are removed by cleaning devices 7*a* to 7*d*.

The transfer sheet P having the toner images secondarily transferred to it is conveyed to a fixing portion 13. The transfer sheet P conveyed to the fixing portion 13 is heated and pressed by passing through a nip portion between a fixing roller and a pressing roller, so that the toner images are fixed to the surface of the transfer sheet P and a predetermined full-color image is formed. The transfer sheet P having the full-color image formed on it is discharged to a discharge portion 17 by a pair of discharge rollers 15.

Figure 2:
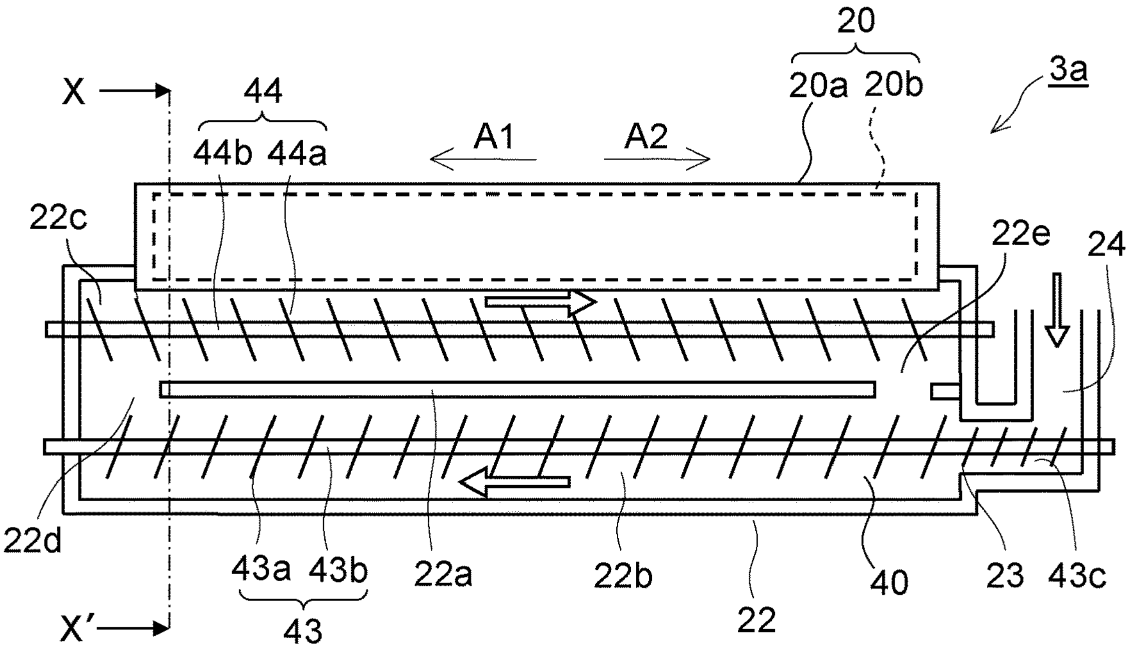
FIG. 2 is a side sectional view showing the structure of a stirring portion in a development device according to an embodiment of the present disclosure.

FIG. 2 is a vertical sectional view showing the structure of a stirring portion in the development device 3*a* according to an embodiment of the present disclosure that is incorporated in the image forming apparatus 100. The following description deals with, as an example, the development device 3*a* arranged in the image forming portion Pa shown in FIG. 1. Basically a similar description applies to the construction of the development devices 3*b* to 3*d* arranged in the image forming portions Pb to Pd and therefore their description will be omitted. In FIG. 2, for convenience' sake, a development roller 20 is shown with its location displaced to above a first conveyance chamber 22*b*.

As shown in FIG. 2, the development device 3*a* includes the development roller (developer carrying member) 20, a first spiral (first stirring conveyance member) 43, a second spiral (second stirring conveyance member) 44, and a development container 22. The development container 22 constitutes the housing of the development device 3*a* and forms a partition portion 22*a*, the first conveyance chamber 22*b*, a second conveyance chamber 22*c*, a first communication portion 22*d*, and a second communication portion 22*e*. The first and second conveyance chambers 22*b* and 22*c* store two-component developer containing magnetic carrier and toner. The development container 22 rotatably holds the first and second spirals 43 and 44 and the development roller 20.

The partition portion 22*a* extends in the longitudinal direction of the development container 22 and divides between the first and second conveyance chambers 22*b* and 22*c* so as to be arranged side by side in the up-down direction. The first and second communication portions 22*d* and 22*e* are formed in parts of the partition portion 22*a* at one and the other sides in the longitudinal direction (downstream in the A1 direction and downstream in the A2 direction), respectively. The first communication portion 22*d* communicates together the downstream ends of the first and second conveyance chambers 22*b* and 22*c* in the A1 direction (first direction). The second communication portion 22*e* communicates together the downstream ends of the first and second conveyance chambers 22*b* and 22*c* in the A2 direction (second direction). The developer circulates through the first conveyance chamber 22*b*, the first communication portion 22*d*, the second conveyance chamber 22*c*, and the second communication portion 22*e*.

The first spiral 43 is arranged in the first conveyance chamber 22*b*. The first spiral 43 has a rotation shaft 43*b* rotatably supported on the development container 22 and a first spiral blade 43*a* provided integrally with a rotation shaft 43*b* and formed in a spiral shape with a constant pitch in the axial direction of the rotation shaft 43*b*. The first spiral 43 rotates by being driven by a driving mechanism, which is not shown, in a predetermined direction (counterclockwise direction in FIG. 3). By rotating in the predetermined direction, the first spiral blade 43*a* conveys, while stirring, the developer in the first conveyance chamber 22*b* in the A1 direction (to one side of the development roller 20 in the axial direction).

On the end face of the first conveyance chamber 22*b* in the A2 direction, a toner supplying port 23 is provided through which to supply toner into the development container 22. To the toner supplying port 23 is connected a toner supplying passage 24 connected to the toner container 4*a* (see FIG. 1). The rotation shaft 43*b* is arranged through the toner supplying port 23 into the toner supplying passage 24. The part of the rotation shaft 43*b* arranged inside the toner supplying passage 24 is formed integrally with a supplying blade 43*c* formed in a spiral shape with a constant pitch in the axial direction of the rotation shaft 43*b*. The supplying blade 43*c* is formed with a spiral-shaped blade pointing in the same direction (having the same phase) as the first spiral blade 43*a*. The supplying blade 43*c* is formed with a smaller pitch and a smaller diameter than the first spiral blade 43*a*.

The second spiral 44 is arranged in the second conveyance chamber 22*c*. The second spiral 44 has a rotation shaft 44*b* rotatably supported on the development container 22 parallel to the rotation shaft 43*b* and a second spiral blade 44*a* provided integrally with the rotation shaft 44*b* and formed with a spiral-shaped blade pointing in the opposite direction (having the opposite phase) to the first spiral blade 43*a*. The second spiral 44 rotates by being driven by a driving mechanism, which is not shown, in a predetermined direction (counterclockwise direction in FIG. 3). By rotating in the same direction as the first spiral blade 43*a*, the second spiral blade 44*a* conveys, while stirring, the developer in the second conveyance chamber 22c in the A2 direction (the direction opposite to the A1 direction) to feed the developer to the development roller 20.

The first and second spirals 43 and 44 stir the developer to electrostatically charge the toner in the developer to a predetermined level. Thus the toner is held on the carrier. As the first and second spirals 43 and 44 rotate, the developer is conveyed through one communication portion (the first communication portion 22d) provided in the partition portion 22a to the second spiral 44 and is then conveyed through the other communication portion (the second communication portion 22e) to the first spiral 43 so that the developer circulates through the first and second conveyance chambers 22b and 22c. Then the developer is fed from the second spiral 44 to the development roller 20 to form a magnetic brush on the development roller 20.

The development roller 20 includes a developing sleeve 20a rotatably supported on the development container 22 and a magnetic member 20b having a plurality of magnetic poles that is fixed to a fixed shaft (not shown) in the developing sleeve 20a. The developing sleeve 20a rotates by being driven by a driving mechanism, which is not shown, in the direction of an arrow in FIG. 3 (counterclockwise direction). The developing sleeve 20a is fed with a development voltage having an alternating-current overlaid on a direct-current voltage.

As shown in FIG. 2, in this development device 3a, the developer in the first conveyance chamber 22b is conveyed, while being stirred, by the first spiral 43 in the A1 direction (toward the first communication portion 22d) and gradually deposits in one side of the first conveyance chamber 22b. In one side of the first conveyance chamber 22b, the developer is pushed by the following developer and is pushed up via the first communication portion 22d into the second conveyance chamber 22c. The developer in the second conveyance chamber 22c is conveyed, while being stirred, by the second spiral 44 in the A2 direction (toward the second communication portion 22e) to be fed to the development roller 20. The developer conveyed to the other side of the second conveyance chamber 22c falls via the second communication portion 22e into the first conveyance chamber 22b.

Figure 3:
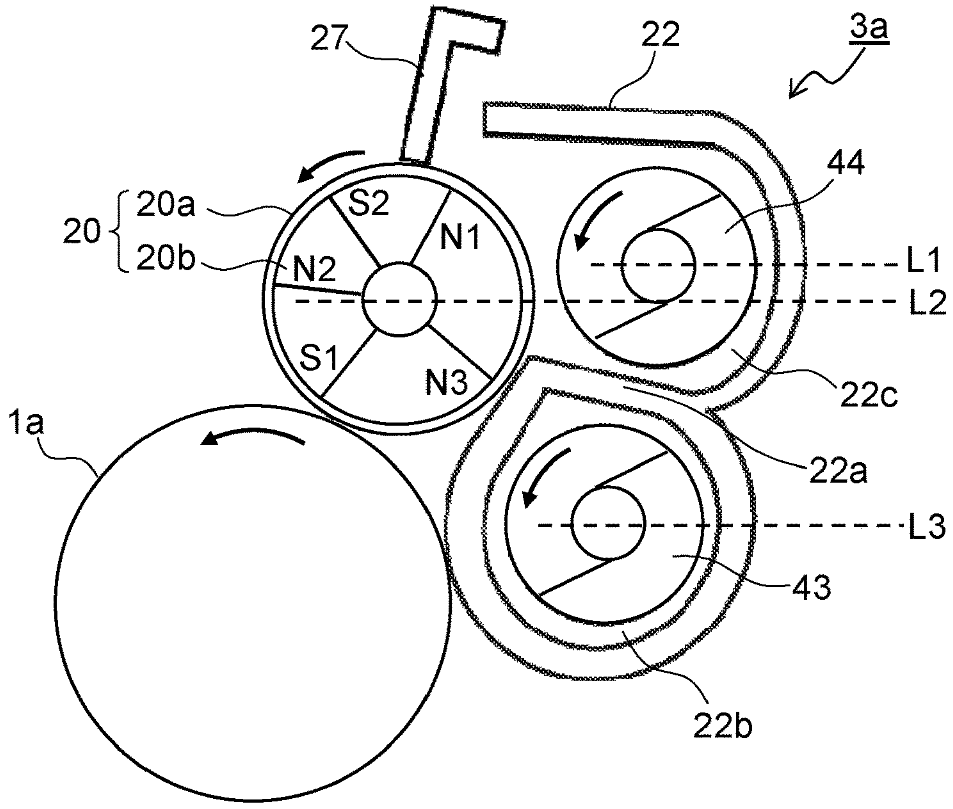
FIG. 3 is a vertical sectional view of the development device according to the embodiment as cut along the direction orthogonal to the longitudinal direction.

FIG. 3 is a vertical sectional view (i.e., a sectional view as seen from the direction of arrows XX' in FIG. 2) of the development device 3a according to the embodiment as cut along the direction orthogonal to the longitudinal direction. As shown in FIG. 3, the development container 22 is fitted with a regulation blade 27. More specifically, the regulation blade 27 is fitted to the development roller 20 along its longitudinal direction (the direction perpendicular to the plane in FIG. 3). A small interval (regulation gap) is provided between a tip part of the regulation blade 27 and the outer circumferential surface of the development roller 20 to form a regulation portion. As the developing sleeve 20a rotates, the developer (magnetic brush) passes through the regulation portion and this regulates the thickness of the developer layer carried on the surface of the development roller 20. In this embodiment, a magnetic blade made of stainless steel (SUS430) is used as the regulation blade 27.

The magnetic member 20b in the development roller 20 has, along the rotation direction of the developing sleeve 20a (counterclockwise direction in FIG. 3), a regulation pole (attraction pole) N1 arranged in an area facing the regulation blade 27 (regulation portion), a main pole S1 arranged in an area facing the photosensitive drum 1a (development area), and a removal pole N3 that removes the developer carried on the development roller 20. It has a five-pole configuration with conveyance poles S2 and N2 arranged between the regulation pole (attraction pole) N1 and the main pole S1. The regulation pole N1 also serves as an attraction pole that attracts the developer to the development roller 20 and thus has a magnetic pole width (center angle) larger than the other magnetic poles. When a driving force is fed to the development device 3a, the developing sleeve 20a rotates but the magnetic member 20b does not.

A magnetic field produced in the attracting direction between the regulation pole N1 of the magnetic member 20b and the regulation blade 27 forms a magnetic brush composed of chains of developer particles between the regulation blade 27 and the development roller 20. When the magnetic brush passes across the regulation blade 27 (regulation portion), the thickness of the developer layer is regulated to a predetermined height. After that, as the developing sleeve 20a rotates counterclockwise, the conveyance poles S2 and N2 apply a magnetic field in the direction along the outer circumferential surface of the developing sleeve 20a and the magnetic brush moves to the development area. Then the main pole S1 applies a magnetic field in the attracting direction against the photosensitive drum 1a and the magnetic brush makes contact with the surface of the photosensitive drum 1a to develop an electrostatic latent image. The toner unused for development is collected in the magnetic brush on the developing sleeve 20a.

As the developing sleeve 20a further rotates counterclockwise, a repelling magnetic field between the removal pole N3 and the regulation pole (attraction pole) N1 moves the magnetic brush away from the development roller 20 and is collected in the second conveyance chamber 22c. After the developer is stirred and conveyed by the second spiral 44, the magnetic field of the regulation pole (attraction pole) N1 again forms a magnetic brush on the developing sleeve 20a.

In the development device 3a according to the embodiment, the second conveyance chamber 22c is arranged above the first conveyance chamber 22b. That is, the first and second conveyance chambers 22b and 22c are arranged in the up-down direction. It is thus possible to reduce the size of the development device 3a in the horizontal direction. In the image forming apparatus 100, four development devices 3a to 3d are arranged in the horizontal direction, so reducing the size of the development devices 3a to 3d is particularly effective in reducing the size of the image forming apparatus 100. The development roller 20 is arranged below the second spiral 44 in the second conveyance chamber 22c. It is thus possible to reduce the size of the development device 3a also in the vertical direction.

The development device 3a according to the embodiment feeds the developer from the second spiral 44 in the second conveyance chamber 22c to the development roller 20. The developer that has passed through the development area and that has consumed toner by development is collected in the second conveyance chamber 22c, where the second spiral 44 is arranged.

As shown in FIG. 3, if the horizontal straight line passing through the center of the rotation shaft 44b of the second spiral 44 in the second conveyance chamber 22c is L1, the horizontal straight line passing through the center of the rotation of the development roller 20 is L2, and the horizontal straight line passing through the center of the rotation shaft 43b of the first spiral 43 in the first conveyance chamber 22b is L3, then L2 is at a position lower than L1 and L3 is at a position lower than L2.

Figure 4:
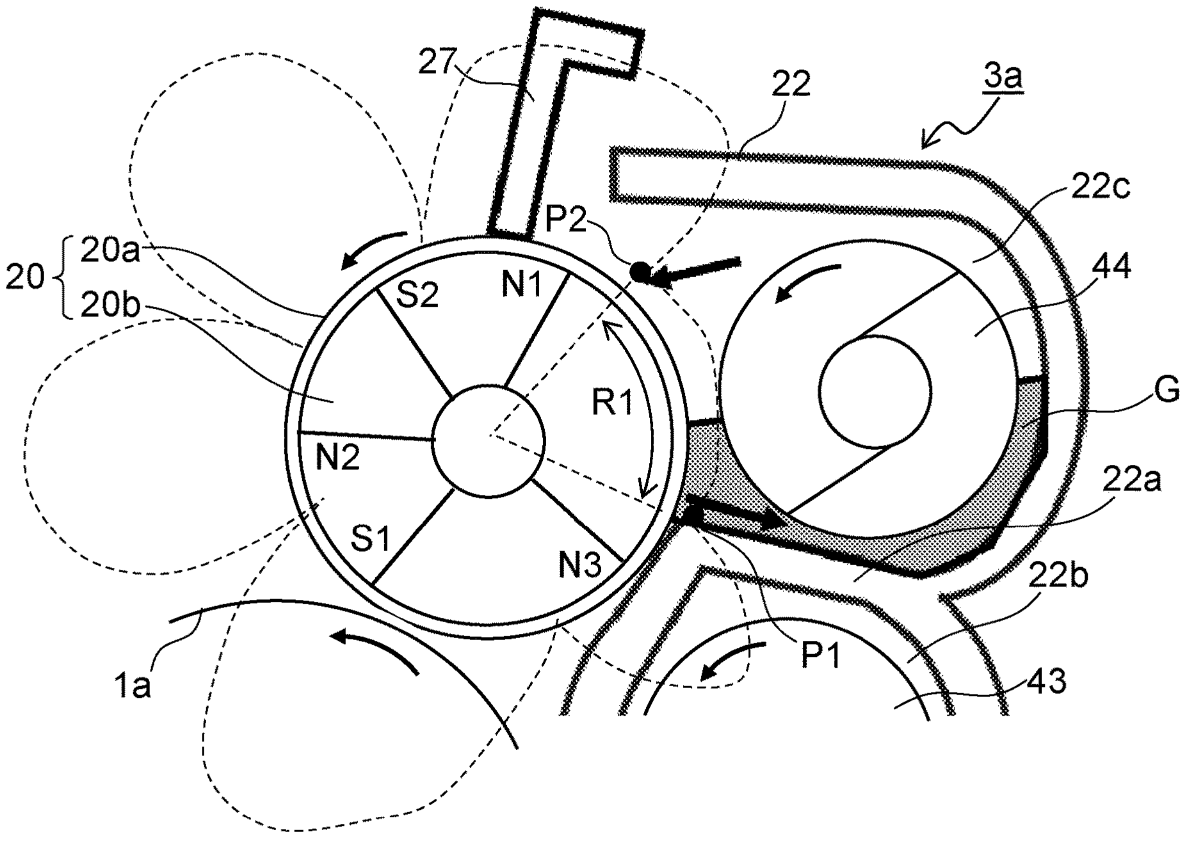
FIG. 4 is an enlarged sectional view around a second conveyance chamber in FIG. 3, illustrating the delivery of developer between a development roller and a first conveyance chamber.

FIG. 4 is an enlarged sectional view around the second conveyance chamber 22c in FIG. 3. With reference to FIG.

4, a description will now be given of the magnetic force distribution around the magnetic member 20*b* and a developer removal area R1 in the development roller 20.

In the development device 3*a* according to the embodiment, point P1 where the magnetic force of the removal pole N3, which removes the developer on the development roller 20 after its passage through the development area, is equal to or lower than 5 mT (i.e. a point between the removal pole N3 and the regulation pole N1 where the peak of the magnetic force of the removal pole N3 falls) is taken as a removal starting position. An area between the removal pole N3 of the development roller 20 and the regulation pole N1 where the magnetic force is equal to or lower than 5 mT is taken as a developer removal area R1. Point P2 where the magnetic force of the regulation pole N1, which attracts the developer on the development roller 20 after its passage through the developer removal area R1, is equal to or higher than 5 mT (i.e., a point between the removal pole N3 and the regulation pole N1 where the peak of the magnetic force of the regulation pole N1 rises) is taken as an attraction starting position.

Here, the removal starting position P1 is located below the straight line L1, at the same height as the top face of the partition portion 22*a*. The attraction starting position P2 is located below the upper end part of the second spiral 44.

Next, the delivery of the developer between the development roller 20 and the second conveyance chamber 22*c* will be described. In the development device 3*a* according to the embodiment, the positional relationship among the straight lines L1 to L3 is defined as shown in FIG. 3 so that the developer is fed to the development roller 20 at a top part of the second spiral 44 in the second conveyance chamber 22*c*, and the developer is separated (removed) from the development roller 20 at a bottom part of the second spiral 44 in the second conveyance chamber 22*c*, as shown in FIG. 4. With this configuration, the developer separated from the development roller 20 is collected in a part in the second conveyance chamber 22*c* loaded with developer G.

In conventional development devices in which a second conveyance chamber is arranged above a first conveyance chamber, the developer separated from a development roller is collected in the first conveyance chamber. In that case, when the developer is separated from the development roller, toner flies up out of the developer and often scatters out through a gap between the development roller and a development container. To cope with that, countermeasures are taken such as providing a developer guide member that prevents the developer from approaching the gap between the development roller and the development container or providing a distance between a photosensitive drum and the gap so that the scattered toner does not affect image quality.

In contrast, the development devices 3*a* to 3*d* according to the embodiment collect the developer separated from the development roller 20 in a bottom part of the second conveyance chamber 22*c* loaded with the developer. This prevents the toner from flying up in the development container 22 and thus prevents the toner from scattering out through the gap between the development roller 20 and the development container 22 to outside the development devices 3*a* to 3*d*.

This eliminates the need to provide a developer guide member and helps reduce the number of members used in the development devices 3*a* to 3*d*. Nor is there any need to provide a distance between the photosensitive drums 1*a* to 1*d* and the development devices 3*a* to 3*d*, so the photosensitive drums 1*a* to 1*d* and the development devices 3*a* to 3*d* can be arranged closer together and this helps reduce the size of the image forming apparatus 100.

Owing to the removal starting position P1 being located below the straight line L1, at the same height as the top face of the partition portion 22*a*, the developer separated from the development roller 20 is collected in a part in the second conveyance chamber 22*c* loaded with developer G. It is thus possible to effectively prevent the toner from scattering out through the gap between the development roller 20 and the development container 22.

Owing to the attraction starting position P2 being located below the upper end part of the second spiral 44, the developer stirred by the second spiral 44 is easily fed by the regulation pole N1 to the development roller 20. It is thus possible to stably form a magnetic brush on the development roller 20.

Figure 5:
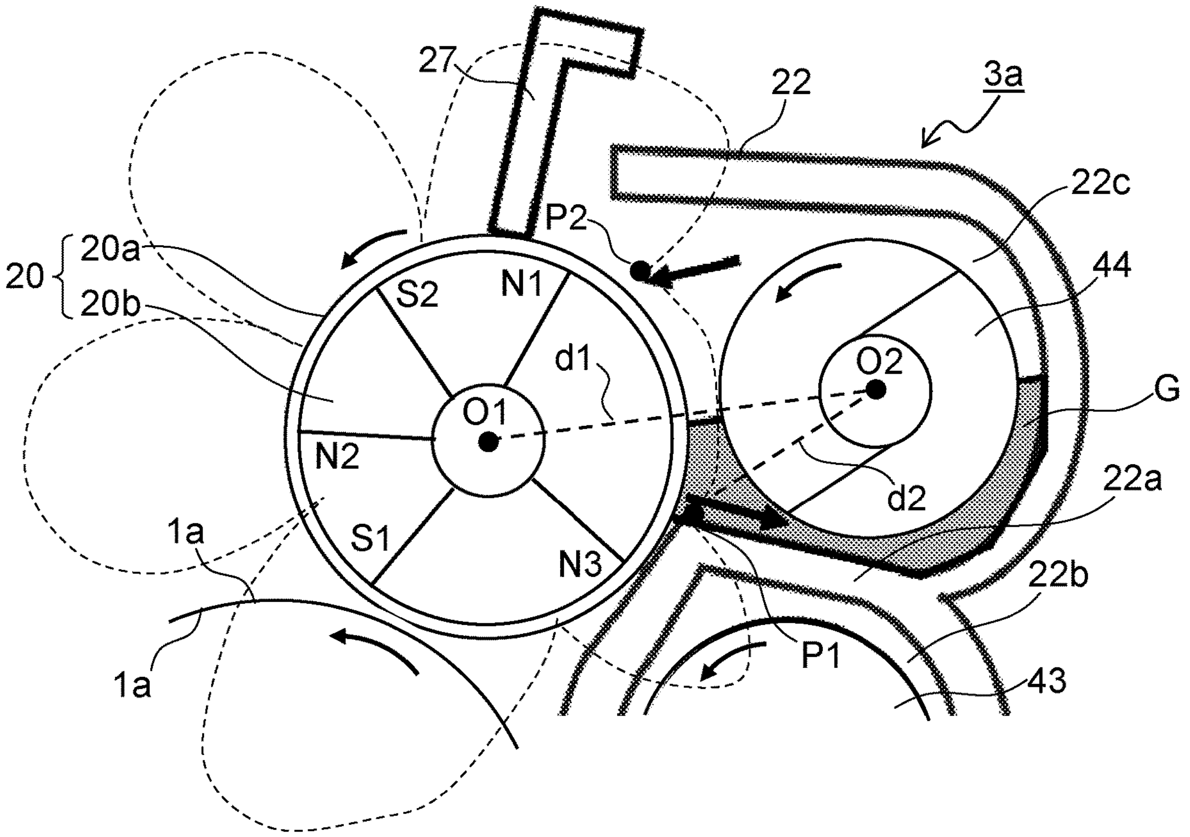
FIG. 5 is an enlarged sectional view around the second conveyance chamber in FIG. 3, illustrating the positional relationship between the development roller and a second spiral.

Next, the positional relationship between the development roller 20 and the second spiral 44 in the development devices 3*a* to 3*d* according to the embodiment will be described with reference to FIG. 5. The symbol d1 in FIG. 5 indicates the length of a line segment connecting between the rotation center O1 of the development roller 20 and the rotation center O2 of the second spiral 44. The symbol d2 in FIG. 5 shows the length of a line segment connecting between the rotation center O2 of the second spiral 44 and the removal starting position P1.

If the distance d1 between the development roller 20 and the second spiral 44 is too short, the layer of developer formed on the outer circumferential surface of the development roller 20 is easily affected by elevations and depressions on the second spiral 44. This may lead to uneven thickness (mixer unevenness) of the layer of developer at the intervals of the screw pitch of the second spiral 44. By contrast, if the distance d1 between the development roller 20 and the second spiral 44 is too large, the distance d2 between the second spiral 44 and the removal starting position P1 is accordingly large. As a result, the second spiral 44 collects developer insufficiently and this may lead to developer removal failure. That is, there are preferred ranges of d1 and d2. To calculate the preferred ranges of d1 and d2, the following tests were performed.

First, to find the preferred range of d1, using development rollers 20 in which the attraction pole N1 had three different peak magnetic forces of 35 mT, 45 mT, and 55 mT, while d1 was varied, half images with a print ratio of 50% were output to check whether mixer unevenness occurred. The test machine was a tandem type color printer like the one shown in FIG. 1 and the tests were performed with the black image forming portion Pd.

The test conditions were as follows: the linear velocity of the photosensitive drum 1*d* (process linear velocity) was 195 (mm/sec), the diameter of the development roller 20 was 16 mm, the ratio of the linear velocity of the development roller 20 to that of the photosensitive drum 1*d* was 1:8, the gap (blade gap) between the development roller 20 and the regulation blade 27 was 0.4 mm, the gap (DS gap) between the photosensitive drum 1*d* and the development roller 20 was 0.34 mm. The results are shown in Table 1.

TABLE 1

| Peak Magnetic Force of Attraction Pole | d1 [mm] 1.25 | 1.5 | 2.0 | 2.5 | 3.0 | 4.0 |
|---|---|---|---|---|---|---|
| 35 mT | Poor | Poor | Good | Excellent | Excellent | Excellent |
| 45 mT | Poor | Poor | Excellent | Excellent | Excellent | Excellent |
| 55 mT | Poor | Poor | Excellent | Excellent | Excellent | Excellent |

As is evident from Table 1, in all of the development rollers 20 with three different levels in the peak magnetic force of the attraction pole N1, the mixer unevenness tended to worsen markedly with d1 smaller than 2.0 mm. This is because if the distance between the development roller 20 and the second spiral 44 is too short, the thin layer of developer formed on the outer circumferential surface of the development roller 20 is easily affected by elevations and depressions on the second spiral blade 44*a* of the second spiral 44.

Figure 6:
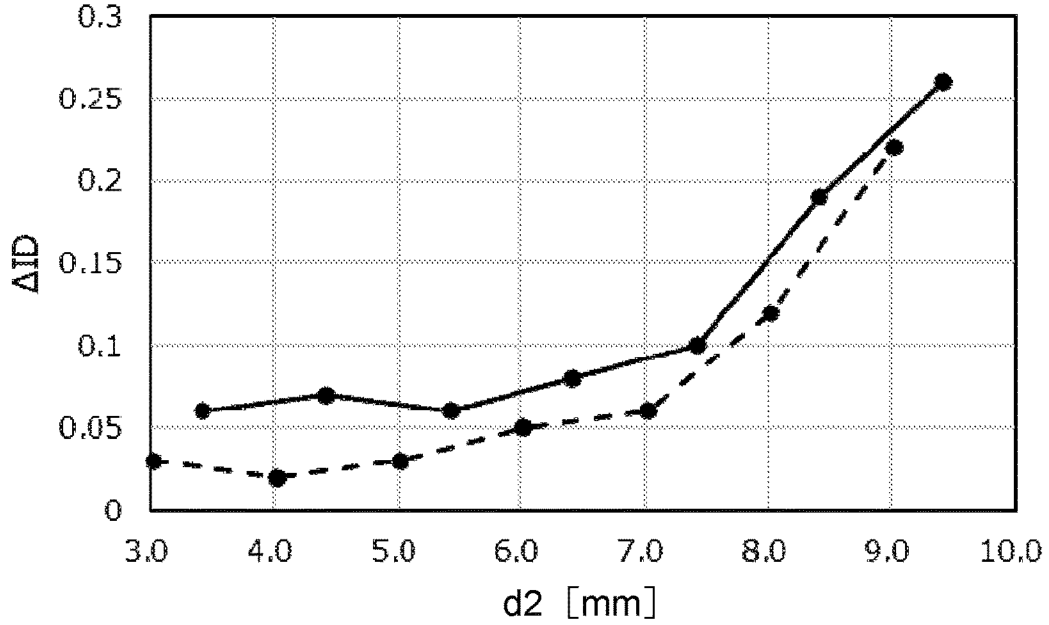
FIG. 6 is a graph showing the results of measuring the difference in density between the leading and trailing ends of images when even-density images were output by using development rollers with different widths of the developer removal area is varied and while d2 was varied.

Next, to find the preferred range of d2, using development rollers 20 in which the width of the developer removal area R1 (removal area width) between the removal pole N3 and the regulation pole N1 of the development roller 20 where the magnetic force was equal to or lower than 5 mT was changed between 42° and 51°, while d2 was varied, even-density images (solid images) were output to measure the difference in density ΔID between the leading and trailing ends of the images. The test machine and the test conditions were the same as mentioned above. The results are shown in FIG. 6. If developer removal failure occurs, the trailing end of the image is fed with developer with consumed toner and thus exhibits a lower image density.

As is evident from FIG. 6, in both of the cases where the removal area width of the development roller 20 was 42° (solid line in FIG. 6) and 51° (broken line in FIG. 6), ΔID tended to be large with d2 exceeding 7 mm. This is considered to be because, even though the developer removed at the removal starting position P1 in the developer removal area R1 of the development roller 20 is collected and stirred by the second spiral 44, if d2 is too large, the second spiral 44 collects developer insufficiently and this leads to developer removal failure.

The above observation confirmed that, if the radius of the development roller 20 is R and the radius of the second spiral 44 is r, it is preferable that formulas (1) and (2) below be satisfied.

$$d1 \geq R + r + 2\ (\text{mm}) \tag{1}$$

$$d2 \leq r + 7\ (\text{mm}) \tag{2}$$

For formulas (1) and (2), the upper limit value of d1 and the lower limit value of d2 are not defined, but if the development roller 20 and the second spiral 44 are arranged to satisfy both formulas (1) and (2), the upper limit value of d1 and the lower limit value of d2 falls within a given range.

The present disclosure can be implemented in any manner other than as in the embodiment described above, and allows for any modifications without departure from the spirit of the present disclosure. For example, while the embodiment described above deals with an example where developer is fed from the second spiral 44 to the development roller 20, this is not meant to limit the present disclosure. A developer carrying member such as a magnetic roller can be further provided between the second spiral 44 and the development roller 20 and after the developer is fed from the second spiral 44 to the development roller 20, the toner can be fed from the magnetic roller and the like to the development roller 20.

While the embodiment described above deals with a configuration where the regulation pole N1 is given a large magnetic pole width and is used also as the attraction pole, an attraction pole may be separately provided upstream of the regulation pole N1 with respect to the rotation direction of the development roller 20. While in the embodiment described above two conveyance poles N2 and S2 are arranged, it is also possible to arrange one, or three or more, conveyance poles.

The present disclosure is applicable not only to direct transfer type color printers like the one shown in FIG. 1 but also to any other types of image forming apparatuses provided with a development device including a first conveyance chamber and a second conveyance chamber arranged above the first conveyance chamber, such as intermediate transfer type color printers provided with an intermediate transfer belt and a secondary transfer roller instead of the conveyance belt 8 and digital and analog type monochrome copiers, color copiers, and facsimile machines.

The present disclosure is applicable to development devices having a first conveyance chamber and a second conveyance chamber arranged above the first conveyance chamber. Based on the present disclosure, it is possible to provide a development device that can prevent toner from scattering out of the development device with a simple configuration, and to provide an image forming apparatus provided with such a development device.

What is claimed is:

1. A development device that develops an electrostatic latent image formed on an image carrying member into a toner image, comprising:

a development container that has a first conveyance chamber and a second conveyance chamber arranged above the first conveyance chamber across a partition portion, the development container storing two-component developer containing carrier and toner;

a first stirring conveyance member that is rotatably supported in the first conveyance chamber, the first stirring conveyance member conveying, while stirring, the developer in the first conveyance chamber in a first direction;

a second stirring conveyance member that is rotatably supported in the second conveyance chamber parallel to the first stirring conveyance member, the second stirring conveyance member conveying, while stirring, the developer in the second conveyance chamber in a second direction opposite to the first direction;

a developer carrying member that is rotatably supported on the development container, the developer carrying member carrying on a surface thereof the developer in the second conveyance chamber;

a regulation blade that is arranged opposite the developer carrying member, the regulation blade regulating a layer thickness of the developer on the developer carrying member;

wherein feeding of the developer to the developer carrying member and collection of the developer from the developer carrying member are performed in the second conveyance chamber, and a horizontal straight line L1 passing through a center of a rotation shaft of the second stirring conveyance member is located above a horizontal straight line L2 passing through a center of a rotation shaft of the developer carrying member and the straight line L2 is located above a horizontal straight line L3 passing through a center of a rotation shaft of the first stirring conveyance member, wherein the developer carrying member includes:

a developing sleeve rotatable and in a cylindrical shape; and a magnetic member fixed inside the developing sleeve so as not to be rotatable, the magnetic member having a plurality of magnetic poles including, along a rotation direction of the developing sleeve, a regulation pole arranged opposite the regulation blade, a main pole arranged opposite the image carrying member, a removal pole that removes the developer carried on the developer carrying member, and an attraction pole that attracts the developer onto the developer carrying member, and a removal starting position that is a position between the removal pole and the attraction pole where a peak of a magnetic force of the removal pole falls, is at a same height as a top face of the partition portion, wherein if a radius of the developer carrying member is R and a radius of the second stirring conveyance member is r, then a length d1 of a line segment connecting between a rotation center of the developer carrying member and a rotation center of the second stirring conveyance member and a length d2 of a line segment connecting between the rotation center of the second stirring conveyance member and the removal starting position satisfy formulas (1) and (2) below.

$$d1 \geq R + r + 2 \text{ (mm)} \quad (1)$$

$$d2 \leq r + 7 \text{ (mm)}. \quad (2)$$

2. The development device according to claim 1, wherein an attraction starting position that is a position between the removal pole and the attraction pole where a peak of a magnetic force of the attraction pole rises is located below an upper end part of the second stirring conveyance member.

3. An image forming apparatus comprising: the development device according to claim 1.

* * * * *